(12) United States Patent
Wu

(10) Patent No.: US 9,784,361 B2
(45) Date of Patent: Oct. 10, 2017

(54) GEAR UNIT HAVING A HOUSING

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 137 days.

(21) Appl. No.: 14/760,966

(22) PCT Filed: Dec. 9, 2013

(86) PCT No.: PCT/EP2013/003701
§ 371 (c)(1),
(2) Date: Jul. 14, 2015

(87) PCT Pub. No.: WO2014/111106
PCT Pub. Date: Jul. 24, 2014

(65) Prior Publication Data
US 2016/0017980 A1 Jan. 21, 2016

(30) Foreign Application Priority Data
Jan. 15, 2013 (DE) .................. 10 2013 000 518

(51) Int. Cl.
*F16H 57/021* (2012.01)
*F16H 57/031* (2012.01)
(Continued)

(52) U.S. Cl.
CPC ......... *F16H 57/021* (2013.01); *F16H 57/023* (2013.01); *F16H 57/031* (2013.01); *F16H 2057/02069* (2013.01)

(58) Field of Classification Search
CPC ........... F16H 57/021; F16H 2057/0216; F16H 57/023; F16H 57/031; F16H 57/0416; F16H 57/0471; F16C 35/04; F16C 35/045
See application file for complete search history.

(56) References Cited

U.S. PATENT DOCUMENTS 2,699,841 A 1/1955 Gunderson
6,202,507 B1 3/2001 Phillips
(Continued)

FOREIGN PATENT DOCUMENTS

CN 201696587 U 1/2011
DE 1 116 490 11/1961
(Continued)

OTHER PUBLICATIONS

International Search Report, dated Feb. 3, 2014, issued in corresponding International Application No. PCT/EP2013/003701.
(Continued)

*Primary Examiner* — Thomas C Diaz
(74) *Attorney, Agent, or Firm* — Andrews Kurth Kenyon LLP

(57) ABSTRACT

A gear unit is provided having a housing, that has a pot-like lower part and a cover plate mounted on it, the lower part having a bottom plate, the bottom plate having a bearing cross that accommodates bearings, especially the bearings of the shafts of the gear unit, the cover plate having a further bearing cross that accommodates bearings, especially the other bearings of the shafts of the gear unit.

17 Claims, 9 Drawing Sheets

(51) Int. Cl.
*F16H 57/023* (2012.01)
*F16H 57/02* (2012.01)

(56) References Cited

U.S. PATENT DOCUMENTS

| | | | |
|---|---|---|---|
| 6,227,712 | B1 | 5/2001 | Mizak |
| 2006/0196304 | A1* | 9/2006 | Konruff ............... F16H 57/023 74/606 R |
| 2011/0094332 | A1 | 4/2011 | Hastings et al. |

FOREIGN PATENT DOCUMENTS

| | | |
|---|---|---|
| DE | 10 2005 053 772 | 5/2007 |
| DE | 10 2009 014 314 | 9/2010 |
| WO | 2012/123046 | 9/2012 |

OTHER PUBLICATIONS

International Preliminary Report on Patentability, dated Jul. 30, 2015, issued in corresponding International Application No. PCT/EP2013/003701.

* cited by examiner

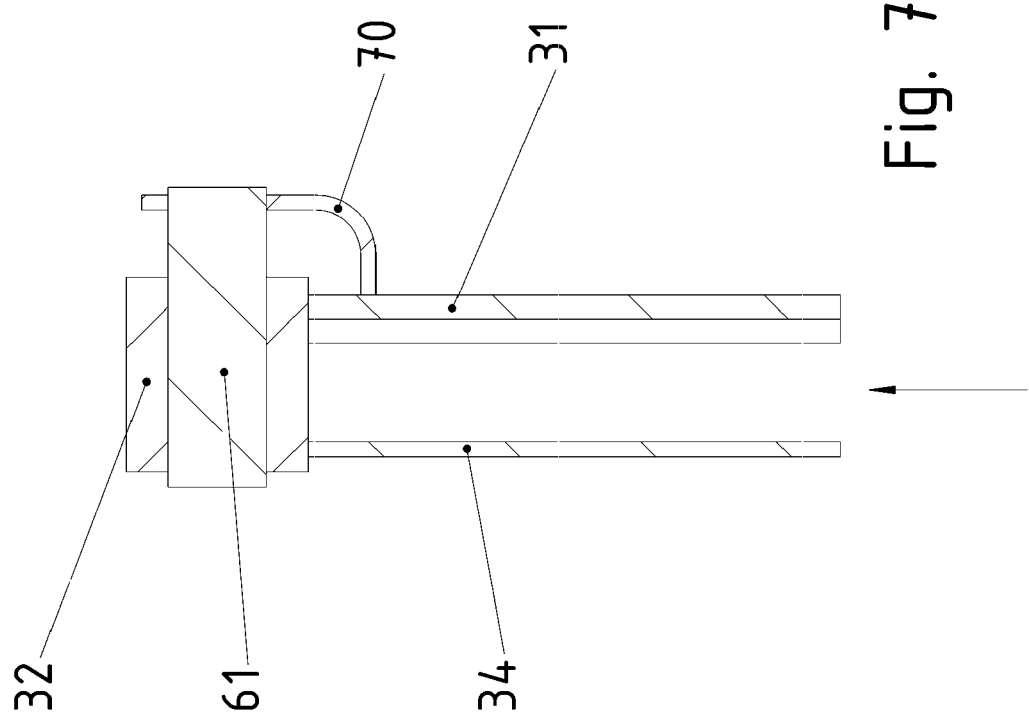

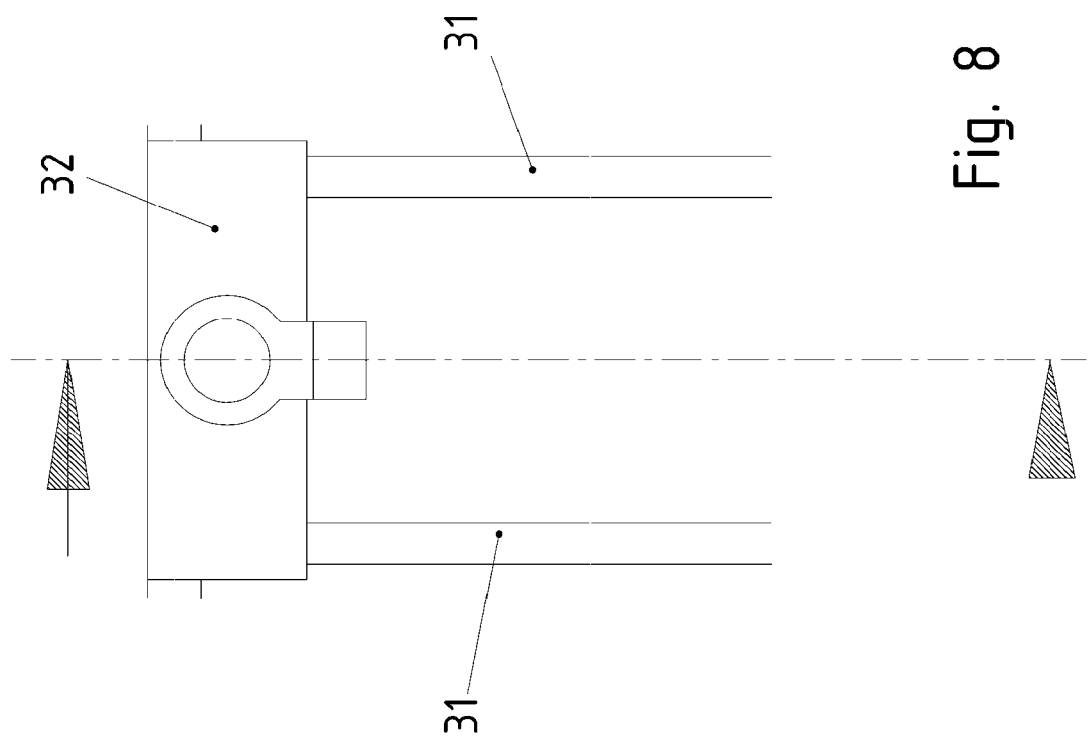

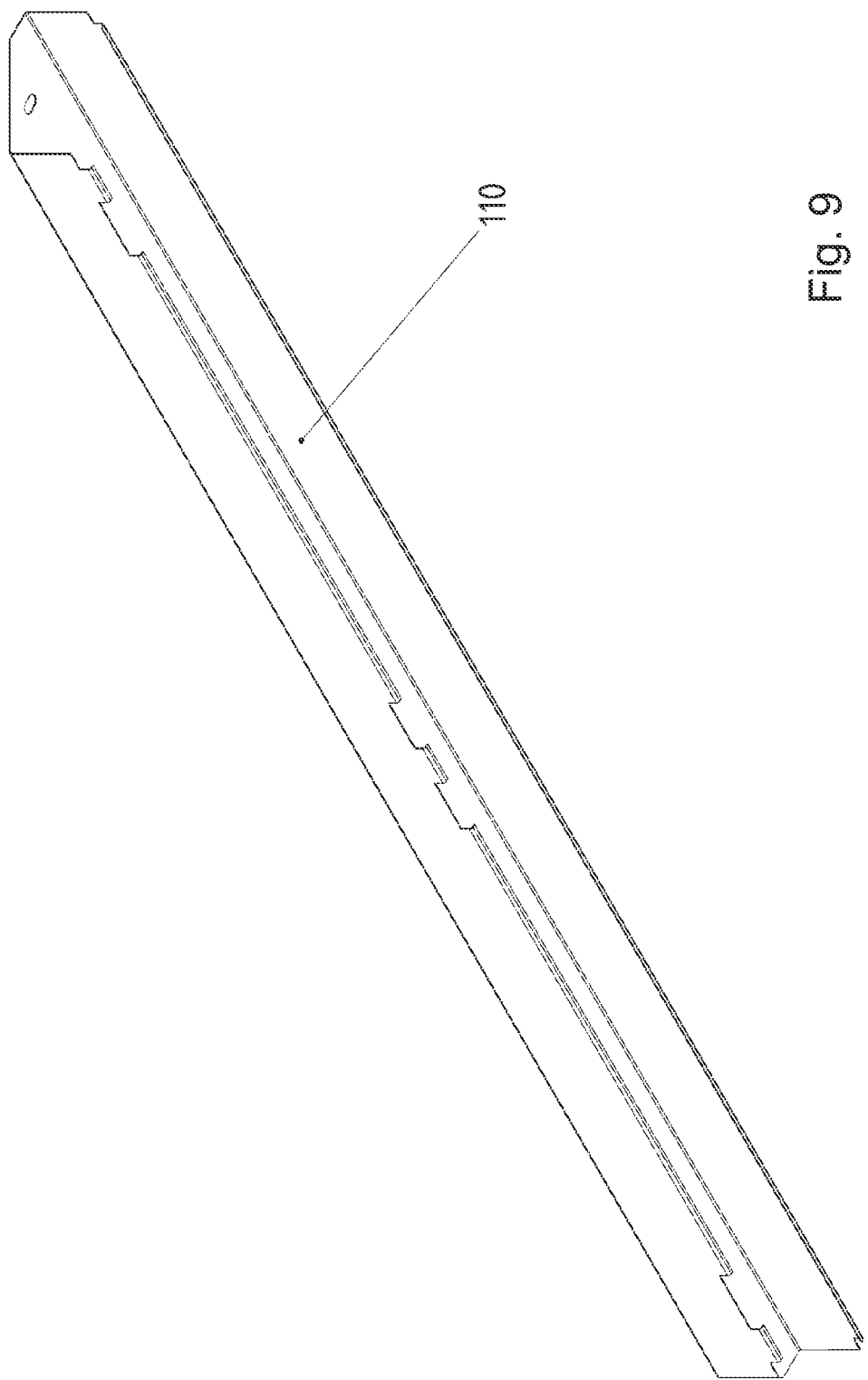

GEAR UNIT HAVING A HOUSING

FIELD OF THE INVENTION

The present invention relates to a gear unit having a housing.

BACKGROUND INFORMATION

It is generally known that gear units have a housing.

SUMMARY

Therefore, an object of the present invention is to further develop a gear unit having a housing.

Features of the present invention with regard to the gear unit having a housing are that it has a pot-like lower part and a cover plate mounted on it, the lower part having a bottom plate, the bottom plate having a bearing cross that accommodates bearings, especially the bearings of the shafts of the gear unit, the cover plate having a further bearing cross that accommodates bearings, especially the other bearings of the shafts of the gear unit.

The advantage in this context is that easy assembly is feasible, high leakproofness for the lubricating oil is achievable with the aid of the pot-like formation of the lower part, high flow velocity of the lubricating oil is attainable by an oil pump, and great stability is achievable, accompanied by low expenditure for material.

In one advantageous development, the bearings are disposed in one line and/or the bearings are disposed in the main trunk of the bearing cross. This is advantageous because a thickened cross is able to be formed, and thus great stiffness is attainable with little material expenditure.

In one advantageous refinement, the bottom plate has fins that are joined at their first end to a frame, especially a U-shaped frame, and with their other end, are joined to the bearing cross of the bottom plate, in particular, the fins being aligned parallel to each other. This has the advantage that the bearing cross is accommodated in a rectangular, especially U-shaped frame, the bearing cross being joined directly to the frame on one hand, and on the other hand, the fins providing additional bracings between the bearing cross and the frame, so that stiffness and heat dissipation are improved.

In one advantageous embodiment, base plates are joined to the frame of the bottom plate, the gear unit being able to be erected on an installation surface by the base plates. The advantage here is that the floor only has to be machined and leveled on the installation surface. The base plates thus form projections directed toward the floor, which pass the weight force of the gear unit and possibly of a load driven by the output shaft projecting from the gear unit downward in the gravitational direction, into the floor.

In one advantageous refinement, the lower part has U-shaped plates, which join the bottom plate to a flange frame, provided on the lower part and located at the end area of the lower part facing away from the bottom plate, on which the cover plate is placed and joined. This is advantageous because stiffness is increased, especially also by the formation as a U.

Preferably six U-shaped plates, set apart from each other in the circumferential direction, are provided, that join the flange frame to the frame. The flange frame and the frame are rectangular, so that together with the bearing crosses, a stable structure is able to be produced.

Since a U-shaped plate is disposed at the front wall and at the lateral side wall, respectively, and thus the lateral sides of the U are transverse relative to each other, increased stability is again attainable.

In one advantageous development, the cover plate has wall sections which are located between the bearing cross of the cover plate and the flange frame of the cover plate, in particular, the wall sections being thinner, thus, thinner-walled, than the bearing cross of the cover plate. This offers the advantage that leak tightness is achievable for the lubricating oil.

In one advantageous refinement, the lower part has side-wall sections which are joined on one side to the flange frame of the lower part, and on the other side, to the bottom plate and/or to the U-shaped plates. The advantage here is that high leakproofness is attainable for the lubricating oil, in doing which, little expenditure for material being necessary, since the side-wall sections are thinner-walled than the U-shaped plates.

In one advantageous embodiment, a window is provided in a cutout in the side-wall section of the lower part and covers this cutout. This is advantageous because it permits inspection in an easy manner.

However, the window is nontransparent, thus, opaque, since it is made of steel.

In one advantageous development, a window frame delimiting a or the cutout in the side-wall section of the lower part is welded to the side-wall section, adhesive agent being provided between the side-wall section and the window frame, in particular, a window being screwed onto the window frame and/or being imperviously joined with a sealing device located in between, the window especially being made of steel and not being transparent. This is advantageous because a stable and tight joint is achievable.

In one advantageous refinement, a pin is disposed on a connecting section and/or on the flange frame, a safety bracket for a carrying cable being located on the pin. This is advantageous because easy transport by a crane is practicable.

In one advantageous development, the U-shaped plate is situated outside of the side-wall section. The advantage in this case is that little lubricating oil is necessary, and great stability, especially long lever-arm lengths are attainable.

Further advantages are derived from the dependent claims. The present invention is not limited to the combination of features in the claims. Further useful combination possibilities of claims and/or individual claim features and/or features of the specification and/or of the figures are apparent to one skilled in the art, particularly from the problem definition and/or the objective set by comparison with the related art.

BRIEF DESCRIPTION OF THE DRAWINGS

FIG. 7 shows an associated cross-section.

FIG. 8 shows an associated longitudinal section.

FIG. 9 shows an oil-collection unit located in the interior of the gear unit.

DETAILED DESCRIPTION

Figure 1:
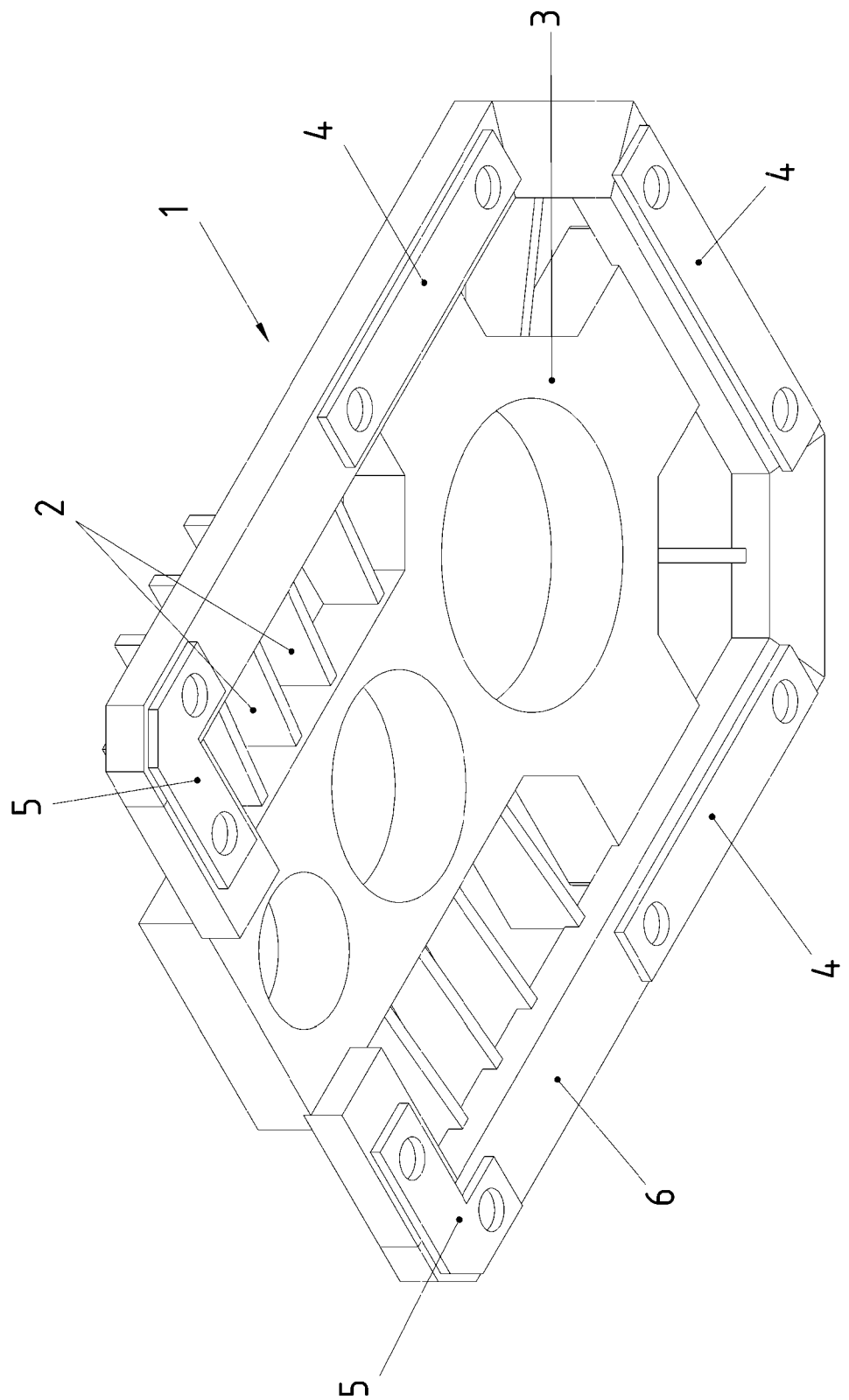
FIG. 1 shows an oblique view of a bottom plate 1 of a gear unit according to the present invention.
Figure 2:
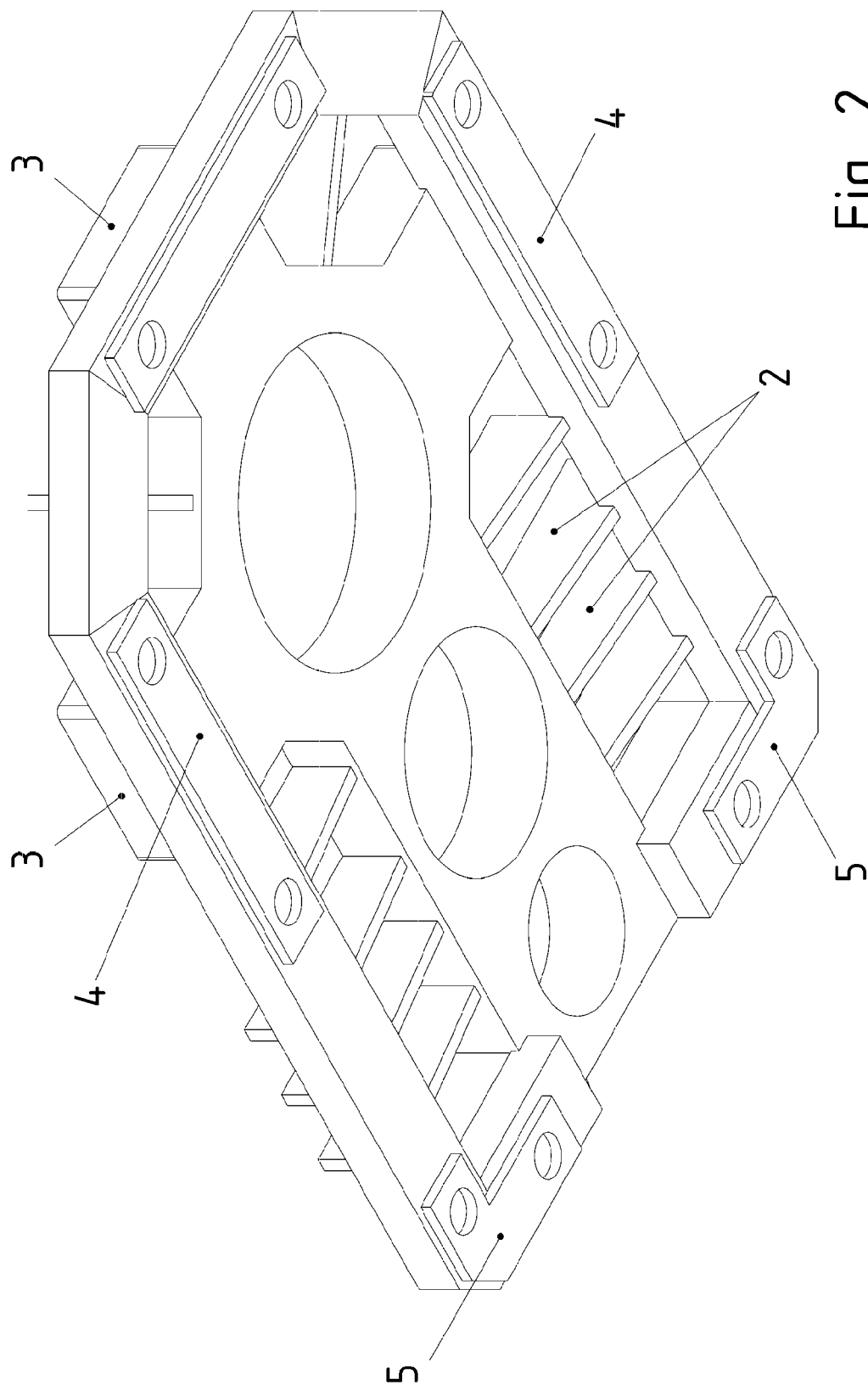
FIG. 2 shows bottom plate 1 from a different viewing direction.
Figure 3:
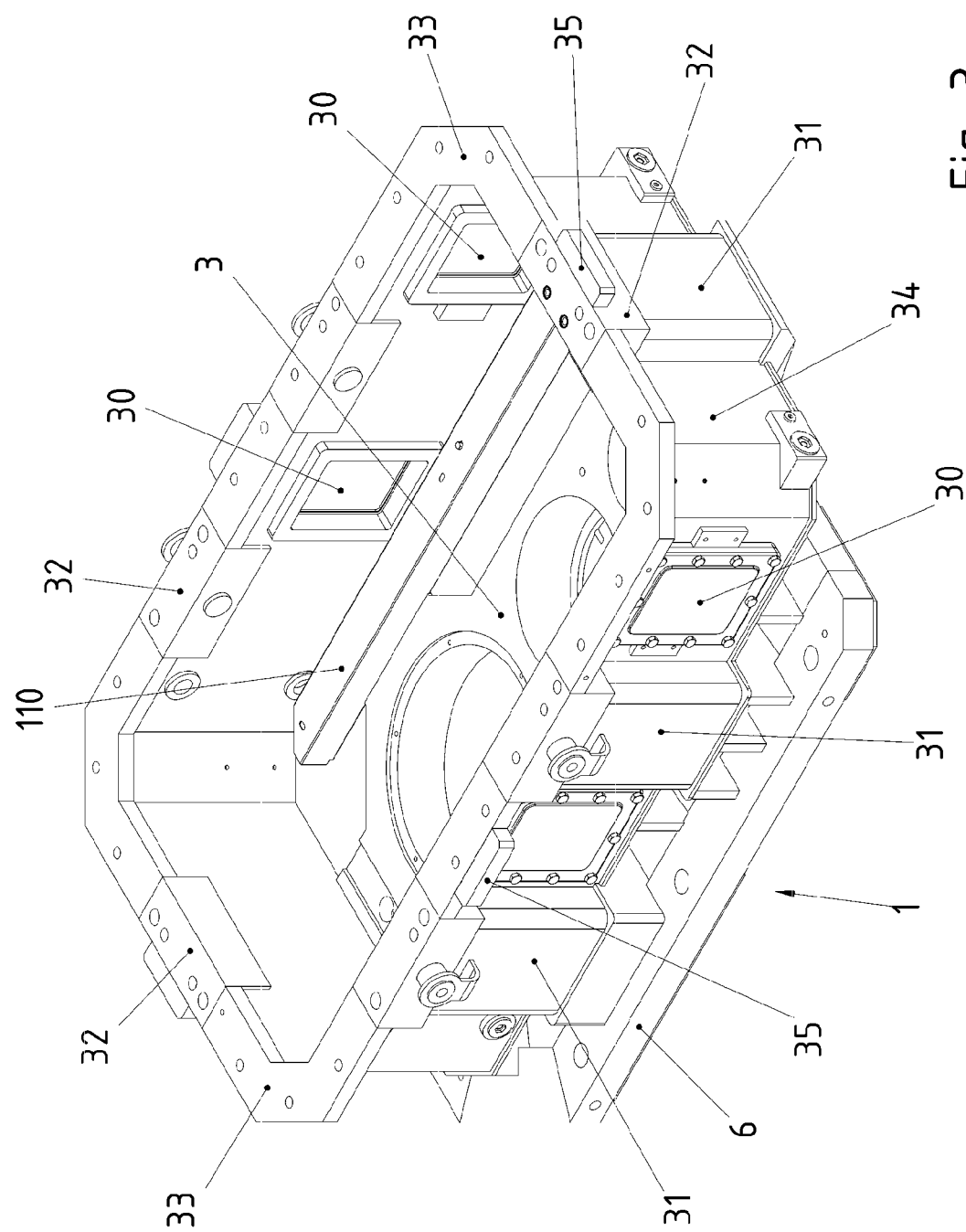
FIG. 3 shows the lower part of the gear unit mounted on bottom plate 1.
Figure 4:
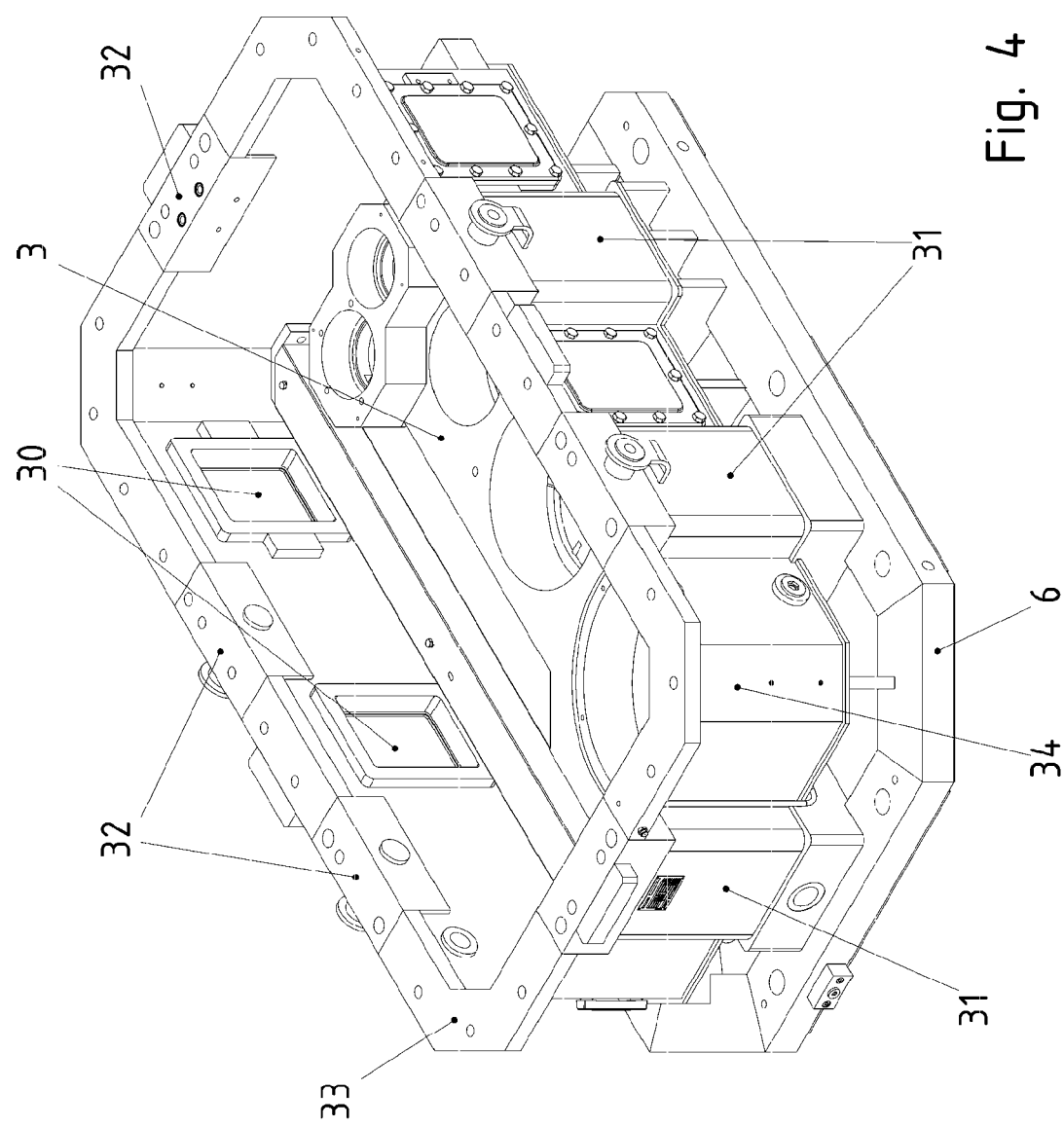
FIG. 4 shows the lower part of the gear unit mounted on bottom plate 1 from a different viewing direction.

As shown in the figures, shafts of the gear unit are supported in at least two bearings each, the respective first bearing of the shafts being accommodated in a bearing cross in bottom plate 1. In this context, bearing cross 3 is a flat cross-like part, which is implemented with great wall thickness, and thus exhibits great stiffness. The four ends of the cross are joined to a U-shaped frame 6, which therefore forms a planar configuration with the cross, thus, in particular, frames the cross.

The locating bores for the bearings are situated on the main trunk of the cross, especially in a linear placement.

In the intermediate area between frame 6 and the main trunk of the cross, fins 2 are disposed which are joined at their respective first end to the main trunk and at their other end to frame 6.

Fins 2 are preferably parallel to one another. In this way, heat dissipation of the bottom plate is improved, and in addition, frame 6 is joined rigidly to bearing cross 3, in doing which, only a little material being necessary.

On the bottom side of frame 6, base plates 4, 5 are disposed, with which the bottom plate is able to be erected on machined floor-area sections.

The lower part of the gear-unit housing is implemented together with the bottom plate in pot-like fashion. To that end, the lower part has side-wall sections 34, which at their end facing the bottom plate, are joined to the bottom plate, and at their other end, thus, at their end facing away from the bottom plate, are joined to a flange frame 33, which is formed completely circumferentially and which has threaded bores, so that the cover plate is able to be mounted on and screw-connected to flange frame 33.

Flange frame 33 has connecting sections 32, that in each case are thickened and have a nose 35 for aligning and centering when joining the cover plate to flange frame 33.

Side-wall sections 34 are thin-walled. Thicker connecting sections 32 are in each case joined by U-shaped plates 31 to a respective end area of bearing cross 3, or alternatively, on U-shaped frame 6.

The U-shaped implementation of plates 31 increases the stability and/or stiffness of the gear-unit housing. In this context, the opening of the U is directed toward the interior of the gear unit, the lateral sides of the U ending at side-wall section 34, and thus forming a rigid connection between flange frame 33 and the bottom plate.

Windows 30 are fitted on some of side-wall sections 34. To that end, side-wall sections 34 in each case have a cutout, whose boundaries form window frames that are glued to, and additionally welded to the outside of respective side-wall section 34. Consequently, a loadable and tight connection exists between the window frame and side-wall section 34, for the welded connection produces a strong joint and the adhesive agent provided between the window frame and side-wall section 34 produces the leak tightness in addition to the loadable and stable connection.

Window 30 is usable as an inspection window and is screwed to the window frame, with a sealing device in between, especially an O-ring seal ensuring leak tightness.

Window 30 is preferably made of steel. When window 30 is open, a view is permitted of the bearing cross and the shafts supported in it.

The pot-shaped form of the lower part makes it possible to easily achieve great leak tightness for the lubricating oil.

Figure 5:
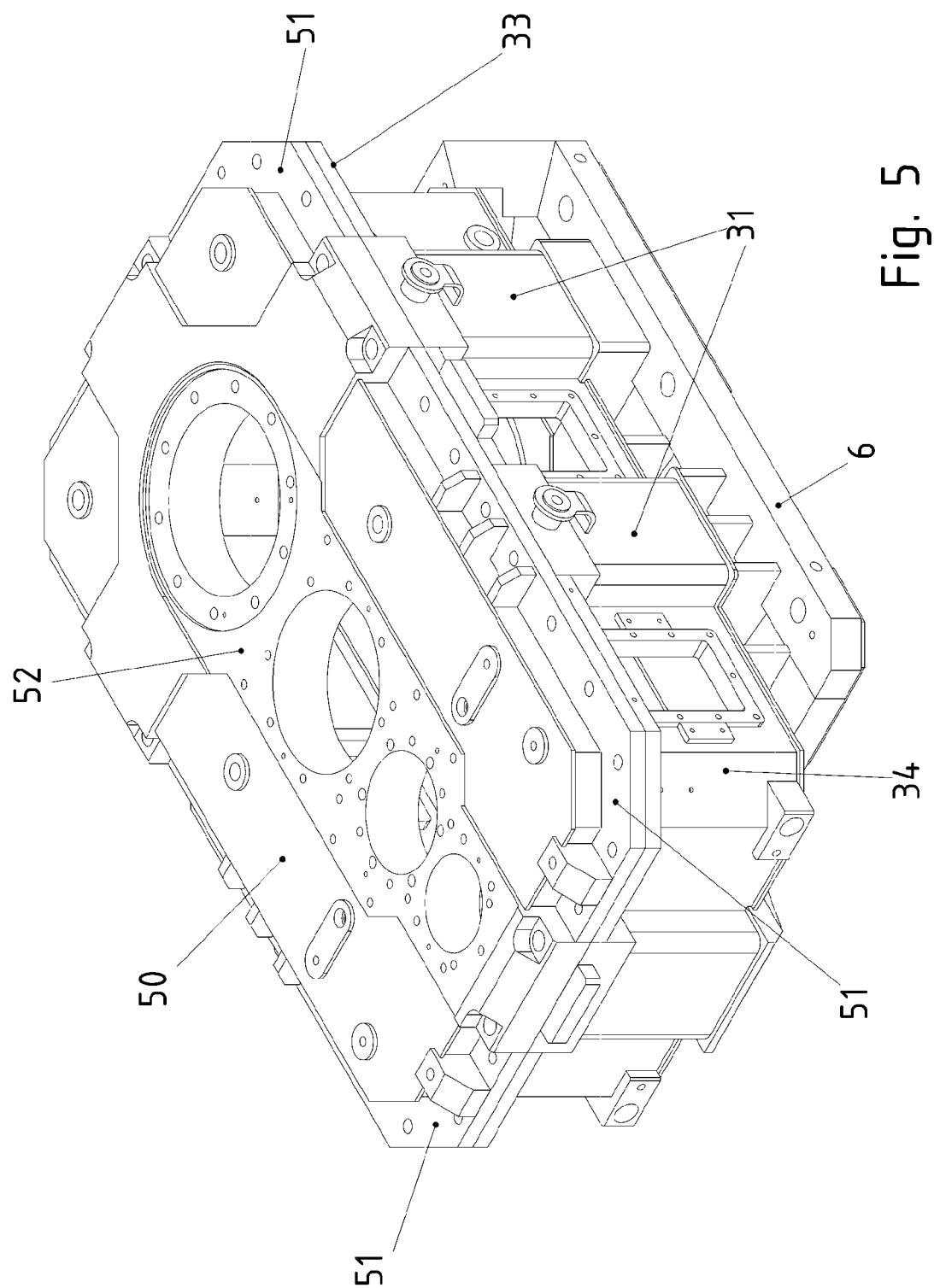
FIG. 5 shows the gear unit with cover plate mounted on the lower part, with bearings, shafts, gearing parts and lubricating oil again not being shown.

As shown in FIG. 5, the cover plate again has a thickened bearing cross 52, so that the other bearing of the shafts is able to be accommodated in this bearing cross 52.

A flange frame 51, which again surrounds bearing cross 52, is likewise disposed in the cover plate and is joined to bearing cross 52 by wall sections 50 which are thinner than bearing cross 52.

In respective connecting section 32, a pin 61 is shaped or welded on, which is suitable for installing a carrying cable for the suspended transport of the gear unit. Since connecting section 32 is thickened, sufficient load-carrying capacity is also attainable.

Figure 6:
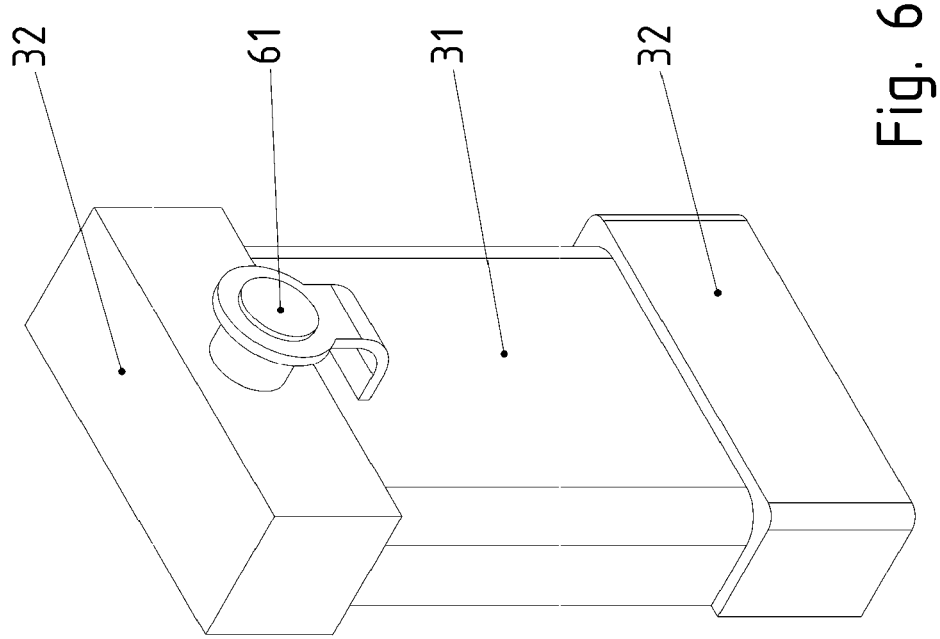
FIG. 6 shows an oblique view of a U-shaped plate for strengthening the gear-unit housing, an accommodation for a carrying cable being disposed on the U-shaped plate.

As shown in FIGS. 6 through 8, to protect the carrying cable from slipping down, a safety bracket 70 is provided running in a bow shape between U-shaped plate 31 and pin 61. Thus, the carrying cable is able to be passed through the opening bounded by pin 61 and safety bracket 70.

The two bearing crosses 3, 52 are set apart from each other in the axial direction of the shafts, but by translation are theoretically able to be brought into alignment in the shaft axial direction.

Connecting section 32, formed in one piece on flange frame 33 and having nose 35, permits an especially precise horizontal alignment of the cover part on the lower part. To that end, the nose is machined on its upper side, and therefore has a well-aligned surface.

Connecting section 32 has threaded bores for the screw connection of the cover part and is implemented with a thicker wall than flange frame 33.

Nose 35 is preferably made of a steel plate welded to connecting section 32 or flange frame 33.

As shown in FIG. 9, located in the interior of the gear unit is also an oil-collection channel 110, which is produced as a stamped bent part, and into which the oil delivered by a pump must flow. An oil-delivery circuit is therefore realized for the gear unit, thus improving the cooling of the gear unit.

LIST OF REFERENCE NUMERALS

1 Bottom plate
2 Cooling fins
3 Bearing cross
4 Base plate
5 Base plate, angled
6 Frame, especially U-shaped frame
30 Window
31 U-shaped plate
32 Connecting section
33 Flange frame
34 Side-wall section
35 Nose
50 Wall section
51 Flange frame
52 Bearing cross
61 Pin
70 Safety bracket for securing the carrying cable
110 Oil-collection channel

What is claimed is:

1. A gear unit, comprising:
    a housing that includes a lower part and a cover plate mounted on the lower part, wherein:
       the lower part includes a bottom plate, the bottom plate includes a bearing cross that accommodates bearings, the cover plate includes a further bearing cross that accommodates further bearings, and each bearing cross having four arm segments, each arm segment extending to a respective peripheral side of the bottom plate, a first pair of arm segments extending substantially orthogonal to a second pair of arm segments, at least one of the arm segments having a width greater than a diameter of at least one of the bearings over an entire length of the of the arm segment; and wherein the bottom plate includes a frame and fins, a first end of each fin being joined to the frame and another end of each fin being joined to the bearing cross of the bottom plate.

2. The gear unit as recited in claim 1, wherein the bearings are of shafts of the gear unit, and wherein the further bearings are of the shafts of the gear unit.

3. The gear unit as recited in claim 1, wherein at least one of (a) the bearings and the further bearings are disposed in one line and (b) the bearings and the further bearings are disposed in a main trunk of the bearing cross.

4. The gear unit as recited in claim 1, wherein the fins are aligned parallel to each other.

5. The gear unit as recited in claim 1, wherein the frame includes a U-shaped frame.

6. The gear unit as recited claim 1, wherein the bottom plate includes a plurality of base plates joined to a frame of the bottom plate, wherein the gear unit is able to be erected on an installation surface with the base plates.

7. The gear unit as recited in claim 1, wherein the lower part includes U-shaped plates which join the bottom plate to a flange frame facing away from the bottom plate, the cover plate being mounted on and joined to the flange frame.

8. The gear unit as recited in claim 7, wherein the cover plate includes wall sections situated between the bearing cross of the cover plate and a flange frame of the cover plate.

9. The gear unit as recited in claim 8, wherein the wall sections are thinner-walled than the bearing cross of the cover plate.

10. The gear unit as recited in claim 7, wherein the lower part includes side-wall sections that on one side are joined to the flange frame of the lower part, and on another side, to at least one of the bottom plate and the U-shaped plates.

11. The gear unit as recited in claim 10, wherein at least one of the U-shaped plates is disposed outside of at least one of the side-wall sections.

12. The gear unit as recited in claim 7, further comprising a pin disposed on at least one of a connecting section and the flange frame, wherein a safety bracket for a carrying cable is located on the pin.

13. The gear unit as recited in claim 7, wherein lateral sides of two of the U-shaped plates are at least one of transverse and perpendicular to each other.

14. The gear unit as recited in claim 13, wherein a first of the two U-shaped plates is disposed on a front side of the gear unit, and wherein another of the two U-shaped plates is disposed on a side of the gear unit.

15. The gear unit as recited in claim 1, wherein a window is provided in a cutout in a side-wall section of the lower part, and covers the cutout.

16. The gear unit as recited in claim 1, further comprising a window frame delimiting a cutout in a side-wall section of the lower part and welded to the side-wall section, wherein an adhesive agent is provided between the side-wall section and the window frame.

17. The gear unit as recited in claim 16, further comprising a window at least one of screwed onto the window frame and tightly joined to the window frame with a sealing device located in between, wherein the window is made of steel and is not transparent.

* * * * *